United States Patent [19]
Guerr

[11] 3,808,908
[45] May 7, 1974

[54] CONTROL LEVER ASSEMBLY

[76] Inventor: Herbert Guerr, 2128 W. 23rd St., Torrance, Calif. 90501

[22] Filed: Mar. 30, 1973

[21] Appl. No.: 346,611

[52] U.S. Cl............... 74/489, 74/102, 74/104, 74/107, 74/501
[51] Int. Cl............................................ G05g 11/00
[58] Field of Search ............ 74/489, 488, 501, 102, 74/104, 107

[56] References Cited
UNITED STATES PATENTS
| 3,719,104 | 3/1973 | Dian | 74/489 |
| 3,759,352 | 9/1973 | Toplis | 74/489 |

Primary Examiner—Samuel Scott
Assistant Examiner—F. D. Shoemaker
Attorney, Agent, or Firm—Theodore H. Lassagne

[57] ABSTRACT

A control lever unit is removably mounted on the handle bars of a motorcycle, bicycle or the like. The frame of the unit is provided with a slideway in which a slide is longitudinally movable by a bifurcate spur depending from a lever pivoted in the frame. The wire of a Bowden cable assembly passes through a central opening in the slide and between the bifurcations of the lever spur to an anchorage in the frame, while the slide itself engages the tube of the Bowden cable assembly to effect movement of it and thus move the remote device to be controlled, such as the clutch or brake of the vehicle.

2 Claims, 6 Drawing Figures

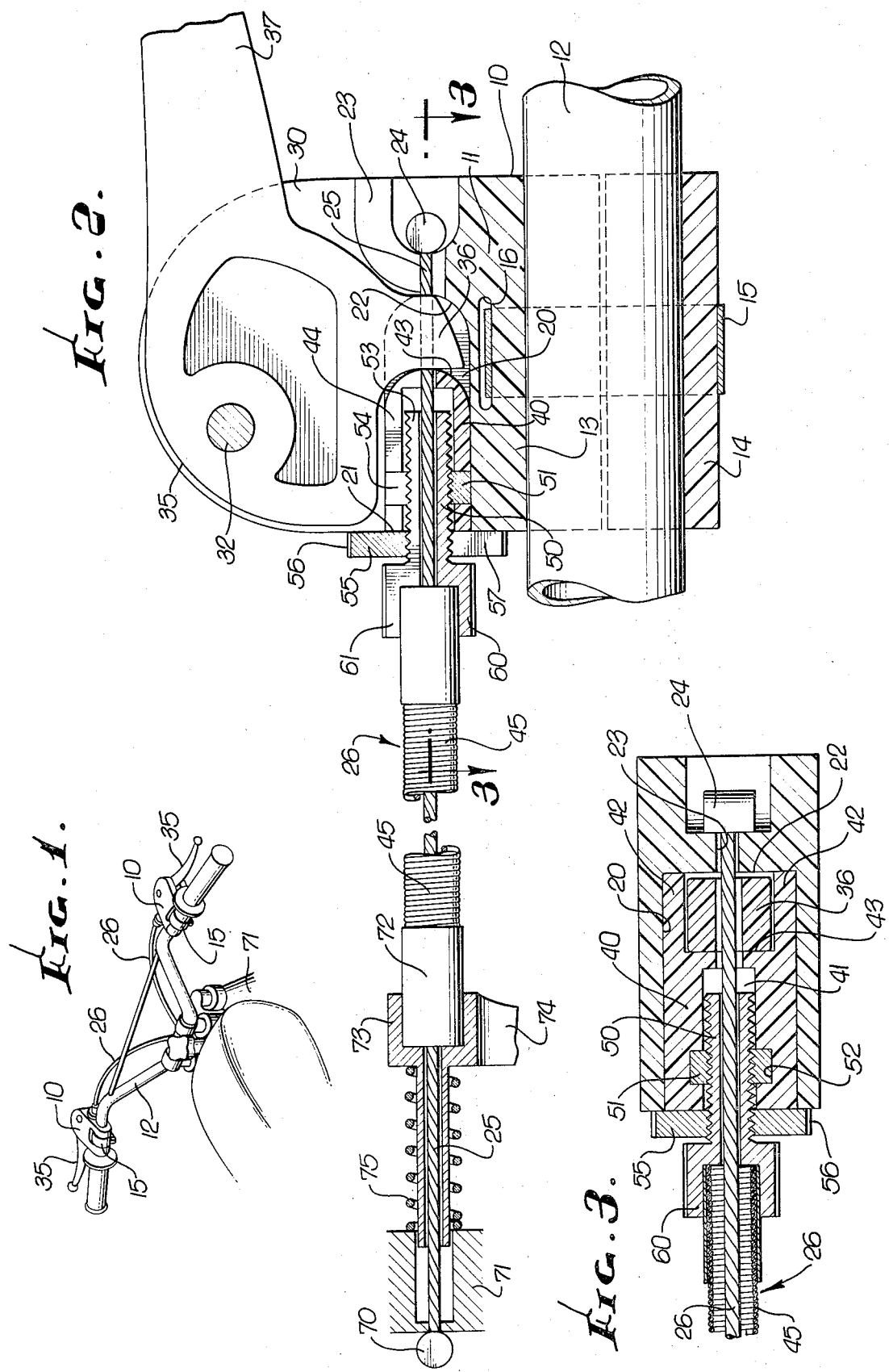

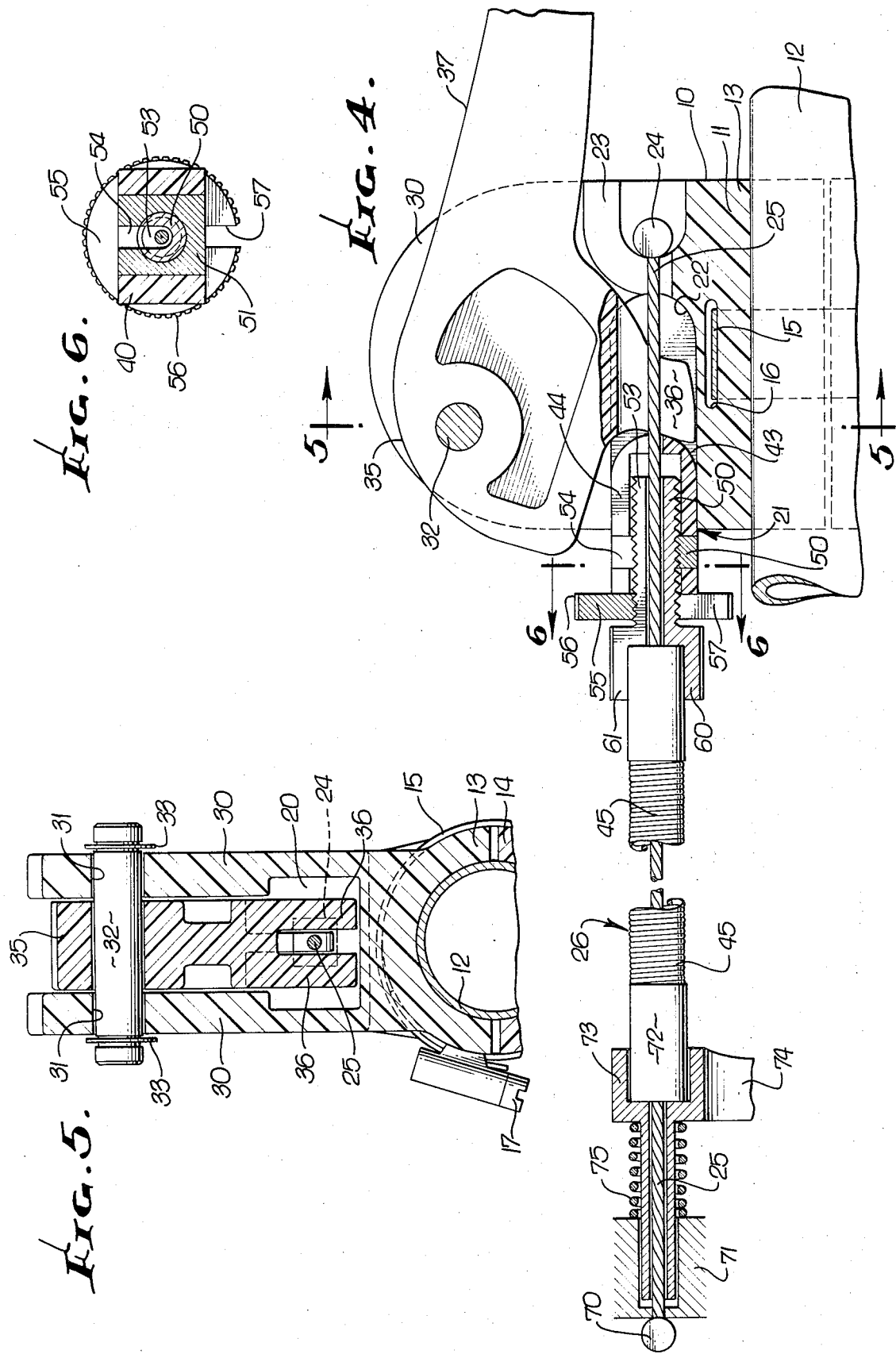

CONTROL LEVER ASSEMBLY

BACKGROUND OF THE INVENTION

1. Field of the Invention

The present invention relates to control lever and flexible actuator systems of the kind adapted for mounting on the handle bars of a vehicle such as a bicycle or motorcycle and connection to the vehicle's braking, power transmission system, etc.

2. Description of the Prior Art

Control of the braking and power transmission mechanisms of bicycles, motorcycles and the like is commonly effected by pairs of control lever assemblies mounted on the handle bars of the vehicle in such a manner as to be convenient to the rider's hands.

Previously known devices of this kind have employed Bowden cable assemblies in the conventional fashion, in which the control movement is transmitted through the wire; and tube remaining stationary, and have thus been subject to failure due to rupture of the relatively fragile wire under the stresses and bending thus imposed. Flexible power transmitting devices, on the other hand, which have transmitted the desired movements through the tube of a Bowden cable assembly while holding the enclosed wire stationary, have not been adapted to control devices of the present kind because of various problems presented by such adaptation.

It is the primary object of the present invention to provide a control lever assembly for motorcycles, bicycles, etc. possessing superior ruggedness and reliability in relation to the devices of the prior art in addition to possessing advantages of simplicity and economy in manufacture, installation and maintenance.

SUMMARY OF THE INVENTION

According to the present invention, a control lever unit is provided which comprises a frame the base of which conforms to and is adapted to be clamped upon a tubular vehicle element such as a handle bar by means such as an ordinary hose clamp. A slideway in the frame of the unit parallels the longitudinally extending base; an abutment at one end of the slideway being slotted to provide an anchorage for the beaded end of the wire of a Bowden cable assembly extending from that anchorage through the slideway and out of the open end thereof.

A lever is pivotally mounted in the control unit frame at a point on the opposite side of the slideway from the base of the unit, and this lever is provided with a spur extending into the slideway, which spur is bifurcated to enable it to straddle the wire of the Bowden cable assembly. Longitudinally movable within the slideway is a slide which is provided with a central passage for the wire of the Bowden cable assembly and a cup engageable with the tube of the Bowden cable assembly; the cup being longitudinally adjustable with respect to the slide itself and capable of being locked in any longitudinally set position.

Upon rocking of the control lever by its handle which extends beyond the frame of the control lever unit and lies approximately parallel to the handle bar of the vehicle, the slide is moved longitudinally with respect to the frame of the unit and with respect to the wire of a Bowden cable assembly anchored therein, thus effecting movement of the tube of the Bowden cable assembly with respect to its enclosed wire. The tube of the Bowden cable assembly, while flexible, is substantially incompressible and therefore serves to transmit the movement of the control lever to the element to be controlled.

At its opposite end the tube is connected to the element desired to be controlled, such as the brake lever of the vehicle, so that movement of the slide of the control lever unit effects corresponding movement of the brake lever.

Upon release of the control unit lever, the spring of the vehicle's brake lever effects retrograde movement of the tube of the Bowden cable assembly with respect to its enclosed wire and thus returns the parts of the control unit in the opposite direction to that in which they were moved by manual operation of the control unit lever, thus eliminating the necessity for any separate spring in the control lever unit itself.

BRIEF DESCRIPTION OF THE DRAWING

FIG. 1 is a perspective view showing a portion of a motorcycle having a pair of control lever assemblies embodying the present invention mounted on the handle bars thereof;

FIG. 2 is a view in side elevation and partly in section showing a control lever assembly embodying the present invention in position on the handle bar of a vehicle and connected to a control element such as a brake lever thereof;

FIG. 3 is a detail sectional view taken on the line 3—3 of FIG. 2;

FIG. 4 is a view corresponding to FIG. 2, but showing the parts in a position to which they are moved following manual operation of the lever of the control unit;

FIG. 5 is a detail view in section taken on the line 5—5 of FIG. 4; and

FIG. 6 is a detail view in section taken on the line 6—6 of FIG. 4.

DESCRIPTION OF THE PREFERRED EMBODIMENT

As illustrated in FIG. 2, a preferred embodiment of the present invention comprises a control lever assembly having a frame 10 which may be of any suitable casting resin. The frame 10 has a longitudinally extending base 11 adapted for attachment to a tubular vehicle part such as a handle bar 12 of a bicycle or motorcycle, as shown in FIG. 1. For this purpose the base 11 is made in two semi-cylindrical portions 13 and 14 (see also FIG. 5) adapted to be held in clamped engagement with the handle bar 12 by means such as a conventional hose clamp 15 passing through a slot 16 (FIGS. 2 and 4) in the portion 13, embracing the portion 14, and constricted around them by means such as a screw 17.

The frame 10 is provided with a slideway 20 (FIG. 5) paralleling the base 11. One end of the slideway 20 is open as indicated at 21 (FIGS. 2 and 3), while its opposite end is closed by an abutment 22 which is slotted, as at 23, to provide an anchorage for the beaded end 24 of the wire 25 of a Bowden cable assembly 26.

The frame 10 has parallel side walls 30 (FIG. 5) having, at a position with respect to the base 11 which is beyond the slideway 20, aligned bores 31 through which a metal pin 32 extends; being retained in position by snap rings 33 seating in grooves in the pin 32. The pin 32 constitutes a pivotal mounting for a control lever 35 which may be manually rocked thereon from the position illustrated in FIG. 2 to the position shown in FIG. 4.

The control lever 35 has a spur 36 which is bifurcated so as to straddle the line of the wire 25 of a Bowden cable assembly disposed in the position shown in the drawings, and an arm 37 of the lever 35 extends beyond the sidewalls 30 in a direction generally perpendicular in relation to the spur 36.

Longitudinally movable within the slideway 20 is an actuating slide 40 of a similar casting resin, having a central passage 41 extending along the line of the wire of a Bowden cable assembly disposed in the position shown in the drawing and a slot 44 communicating with the passage 41. Parallel wings 42 at one end of the slide 40 extend on opposite sides of the spur 36 (see FIG. 3) and are adapted to engage the abutment 22 to limit movement of the slide 40 to the right as viewed in FIGS. 2, 3 and 4. A rounded abutment 43 adjacent one end of the slide 40 is engageable by the spur 36 to move the slide 40 toward the left as shown in FIGS. 2, 3 and 4 when the lever 35 is moved from the position shown in FIG. 2 to the position shown in FIG. 4.

The slide 40 is provided adjacent the end opposite the abutment 43 with means longitudinally adjustable with respect to the slide 40 for engaging the substantially incompressible tube 45 of a Bowden cable assembly disposed in the position shown in the drawings. This means comprises an externally threaded, metal tubular member 50 (FIGS. 2, 3, 4 and 6) engaging the internal threads of a metal nut 51 frictionally retained in a slot 52 in the slide 40. The tubular member 50 is slotted as shown at 53 (FIG. 6) and the nut 51 is slotted as shown at 54 for a purpose to be described. A second metal nut 55 having a knurled periphery 56 is rotatably threaded upon the tubular member 50 and serves as a lock nut for the tubular member 50. This nut 55 also is slotted as shown at 57 in FIG. 3 for a purpose to be described. The end of the member 50 remote from the slide 40 is provided with a knurled head 60 dimensioned to frictionally engage over one end of the tube 45 of a Bowden cable assembly disposed in the position shown in the drawings, and this head 60 likewise is slotted as shown at 61 (FIG. 3).

The slotting 44 of the slide 40, the slotting 53 of the tubular member 50, the slotting 54 of the nut 51, the slotting 57 of the nut 55, and the slotting 61 of the head 60 are provided to permit the easy insertion and removal of the wire 25 of a Bowden cable assembly 26 into and its removal from the position in which it is shown in the drawings; all of these slottings being capable of being brought into alignment with each other for that purpose and thereafter moved out of alignment to retain the wire 25 in place.

The control lever assembly is prepared for operation by first removing a snap ring 33 and the pin 32 and then removing the lever 35 from the frame 10, and also removing the slide 40 from the slideway 20. The beaded end 24 of the wire 25 is then anchored in the slot 23 with the wire extending through the slideway 20.

Next, the slide 40 is assembled onto the wire 25 by aligning the slots 53 and 61 of the tubular member 50 and its head 60 with the slot 44 of the slide 40 and the slot 54 of the nut 51; the slot 57 of the nut 55 then being aligned with those slots. The wire 25 is then inserted through the aligned slots which are then moved out of alignment with each other to retain the slide 40 in assembled relationship with the wire 25, and the slide 40 is inserted in the slideway 20.

Finally the lever 35 is assembled into the frame 10 in the position in which it is shown in the drawings and, after all desired adjustments have been made, the pin 32 is inserted to the position in which it is shown in the drawing, and secured by attaching a snap ring 33. The entire assembly is then secured to the handle bar by the clamp 15.

The opposite beaded end 70 of the wire 25 of the Bowden cable assembly 26 is then anchored in a slot similar to the slot 23 in the frame 71 of the machine to be controlled, and the adjacent end 72 of the tube 45 of the Bowden cable assembly 26 is frictionally engaged within a head 73 of a lever 74 connected in any desired manner to effect control of a brake, clutch or other element of the machine. Such elements are ordinarily urged toward one limit of their movement by a spring such as the spring 75 (FIGS. 2 and 4) which, when the device of the present invention is in use, serves to urge the parts toward the position in which they are shown in FIG. 2.

It is of course necessary to select a Bowden cable assembly of the proper length to permit the mounting of the control lever assembly of the present invention in a convenient position on the handle bars as shown in FIG. 1. Adjustments within moderate limits to eliminate any lost motion between the slide 40 and the tube 45 can be made by screwing the tubular member 50 further out of the nut 51 and then locking it in position by screwing the lock nut 55 down against the end of the slide 40.

With the control lever assembly mounted as shown in FIG. 1, it is then necessary only to compress the lever arm 37 toward the handle bar 12 to cause operation of the vehicle control lever 74. Rocking of the lever 35 clockwise from the position shown in FIG. 2 to the position shown in FIG. 4 in such operation moves the slide 40 leftward as viewed in those figures, and such motion is transmitted through the substantially incompressible tube 45 of the Bowden cable assembly 26 to the machine control lever 74. Upon release of the lever arm 37 the machine's spring 75 effects reverse movement of these parts, returning them to the position shown in FIG. 2.

I claim:

1. A control lever assembly comprising a frame having a longitudinally extending base adapted for attachment to a tubular vehicle part, a slideway paralleling said base and having an abutment at one end including an anchorage for the wire of a Bowden cable assembly and parallel side walls, a pivotal mounting carried between said side walls at a position with respect to said base which is beyond said slideway, a control lever rockably mounted by said pivotal mounting and having a birfucate spur extending into said slideway, and an arm extending beyond said sidewalls generally perpendicularly in relation to said spur, and an actuating slide longitudinally movable in said slideway and having a central passage for the wire of a Bowden cable assembly anchored by attachment to said anchorage, an abutment adjacent one end engageable by said spur, and means adjacent its opposite end for engaging the tube of a Bowden cable assembly the wire of which is anchored as aforesaid, to effect sliding movement of said tube in relation to such a wire.

2. A control lever assembly according to claim 1 in which the means for engaging the tube of a Bowden cable assembly includes a tubular member carried by said slide and longitudinally adjustable with respect thereto.

* * * * *